INVENTORS
MU-YUE HSIAO
KWANG YUE SIH
BY Owen L. Lamb
AGENT

June 24, 1969 MU-YUE HSIAO ET AL 3,452,328

ERROR CORRECTION DEVICE FOR PARALLEL DATA TRANSMISSION SYSTEM

Filed June 7, 1965

Sheet 2 of 2

United States Patent Office 3,452,328

Patented June 24, 1969

3,452,328

ERROR CORRECTION DEVICE FOR PARALLEL DATA TRANSMISSION SYSTEM

Mu-Yue Hsiao and Kwang Y. Sih, Poughkeepsie, N.Y., assignors to International Business Machines Corporation, Armonk, N.Y., a corporation of New York Filed June 7, 1965, Ser. No. 461,704
Int. Cl. G08b 29/00, 25/00
U.S. Cl. 340—146.1 7 Claims

ABSTRACT OF THE DISCLOSURE

A cyclic error detection and correction apparatus for a parallel channel system. A parallel linear feed-back shift register has a total number of stages equal to the number of check bits transmitted following a message and has a plurality of inputs connectable to receive parallel data. All of the bits of a message code word are shifted into the shift register in parallel and into a plurality of buffer registers large enough to buffer an entire message block. During a detection cycle, the bits which are shifted into the shift register are operated upon in accordance with the feed-back connections of the register. After all of the bits of the message have been shifted into the buffer registers and into the shift register, a correction cycle is taken during which time the shift register is disconnected from the input of the parallel channel and the contents of the buffer are shifted out while the shift register is also shifted.

A bit pattern detector is coupled to the shift register and emits a pulse in one of the channels when an error pattern is recognized. The time at which the pattern is recognized in the correction cycle coincides with the time at which the erroneous bit is shifted out of the buffer. The particular channel containing the error is identified by the pattern, there being one unique pattern for each channel.

TABLE OF CONTENTS

Background of the Invention
Summary of the Invention
Brief Description of the Drawings
1.0 Description of the Invention
2.0 Review of Prior Art Single Channel System Employing Cyclic Codes (Serial Circuits)
2.1 Encoding a Single Channel Message
2.2 Decoding and Correcting a Single Channel Message
3.0 Development of Circuits for Embodiment of Invention in a Multichannel System (Parallel Circuits)
3.1 Encoding a Multichannel Message
3.1.1 Example: Encoding the Message $1+X+X^{10}$
3.2 Decoding and Detection of Multichannel Cyclic Codes
3.3 Single Error Correction
3.3.1 Extension of the Example in 3.1.1 to Error Correction
3.4 Multiple Error Correction This invention relates to data transmission systems, and more particularly to such systems employing cyclic error-detecting and correcting codes.

Cyclic error-detecting and correcting codes are well known in the art. For example, such codes are implemented in a serial data transmission system disclosed by J. E. Meggitt in U.S. Patent 3,162,837. That patent describes in detail apparatus directed to the detection and correction of multiple related errors in a serial data transmission system.

In data processing systems and in some communication systems, information is transmitted serially by character and parallel by bits within a character. Application of cyclic error-detecting codes to such multiple parallel channels is disclosed in copending patent application of J. C. Kennedy and J. H. Sorg, Jr., Ser. No. 459,854. The well-known cyclic codes prior to Kennedy and Sorg were used only for strictly serial transmission, where the encoding device has one input and one output. Kennedy and Sorg teach how cyclic codes may be implemented in multiple, parallel channel systems, and provide for error detection. In most cases, in addition to error detection it is desirable to correct at least single errors occurring during data transmission.

Summary of the invention

It is an object of this invention to provide a multiple parallel channel error correction device.

It is also an object of this invention to provide a means for receiving parallel encoded messages, for examining the coded message to detect an error pattern and to correct the message when the error pattern is detected.

Briefly, the above objects of this invention are accomplished by providing a parallel feedback shift register decoder adapted to receive a multiple parallel channel code. The parallel shift register has a total number of stages equal to the number of check bits transmitted following the message and has a plurality of inputs adapted to receive the parallel code. A detection cycle is taken, in which all of the bits of the code word are shifted into the shift register in parallel and into a plurality of buffer registers large enough to buffer an entire message block. During the detection cycle, the bits which are shifted into the shift register are operated upon in accordance with the feedback connections of the register. After all of the bits of the message have been shifted into the buffer and into the shift register, a correction cycle is taken during which the contents of the buffer are read out and the shift register is cycled. A bit pattern detector is coupled to the shift register stages and emits a pulse when particular error patterns are recognized in the register. The time at which a pattern is recognized in the shift cycle coincides with the time at which the erroneous bit leaves the buffer. The particular track is identified by the pattern, there being one unique pattern for each track. Means for inverting the output of a buffer to correct for the erroneous bit is provided and is responsive to its respective bit pattern.

The invention has the advantage that it is much faster than the conventional serial scheme and provides not only a means of detection but also a means of correcting single errors in a parallel data transmission system.

The invention has the further advantage that it is adaptable to any number of plural inputs and any choice of correction code available to serial circuits may be used, based upon the message length and the error correction requirements.

The foregoing and other objects, features and advantages of the invention will be apparent from the following more particular description of a preferred embodiment of the invention as illustrated in the accompanying drawings.

1. DESCRIPTION OF THE INVENTION

Figure 1:
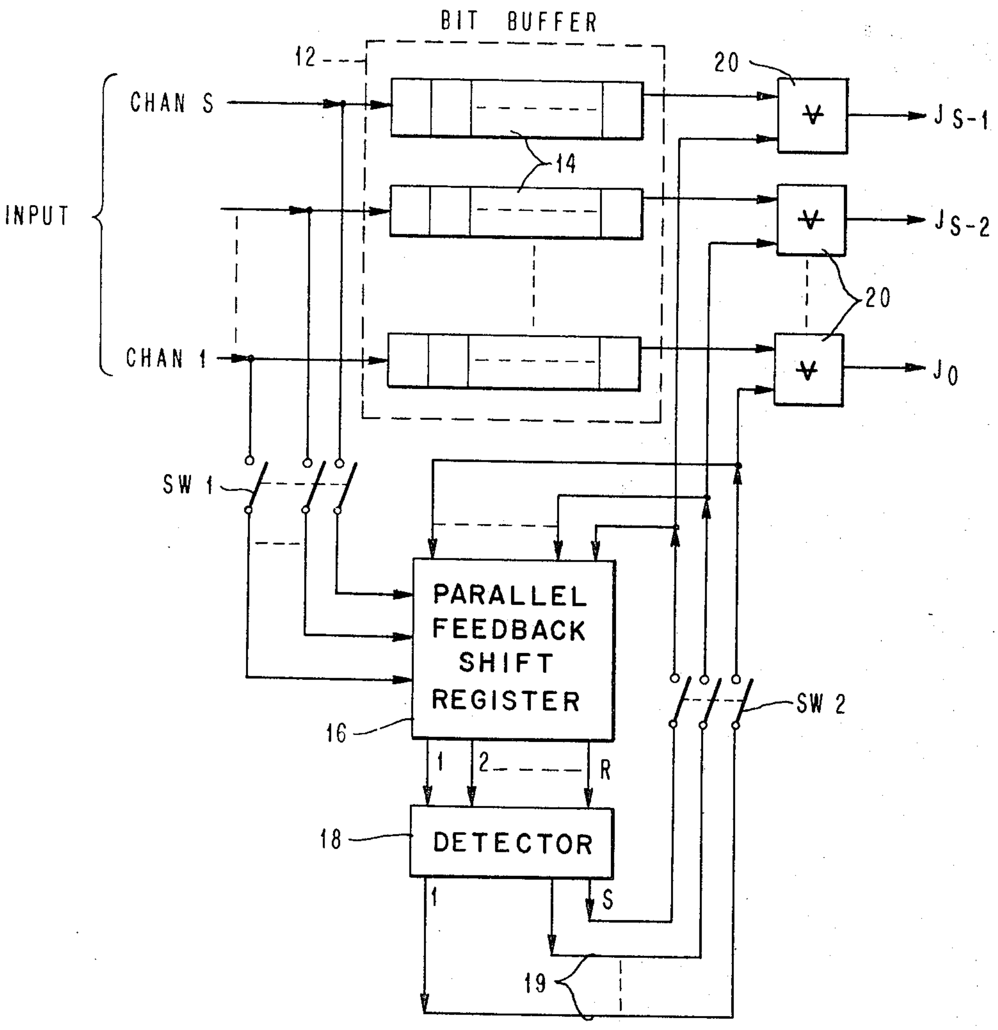
FIG. 1 is a block schematic diagram of an error-correcting system constructed in accordance with the invention where the system has an $s$ channel input.

Briefly, the invention may be summarized with reference first of all to FIG. 1 which shows a block schematic diagram in general from of an error correction system constructed in accordance with the invention. Input data are received on $s$ parallel channels. The parallel channels are connected to a bit buffer 12 which is comprised of separate storage units 14 which are of a sufficient length to store all of the data received on a particular channel. The received data block represents a code word of the type generated by an encoder described in the Kennedy and Sorg, Jr. patent application; that is, the code word is comprised of information-carrying bits followed by error-checking bits constructed in accordance with a cyclic code. A switch SW1 is provided for applying all of the $s$ channels to a parallel feedback shift register 16 which is constructed in accordance with the characteristics of the cyclic code utilized in the encoder. There are $r$ check bits in the received message; hence, there are $r$ stages in the parallel feedback shift register 16.

A detector 18 is provided, connected to all $r$ stages of the shift register 16. The detector 18 detects $s$ unique error patterns and emits a pulse on one of the lines 19, when an error pattern associated with such line is detected. A switch SW2 is provided to connect each output of the detector 18 to one leg of Exclusive OR circuits 20. The other inputs to the Exclusive ORs are provided by the output stages of the storage devices 14 in the bit buffer 12.

A typical error correcting sequence is comprised of a detection cycle during which the input data are read into the bit buffer and into the parallel feedback shift register 16, and a correction cycle during which the data in the bit buffer are shifted out sequentially while the parallel feedback shift register 16 is cycled (e.g., zeros are shifted into the register 16 by opening SW1).

During the detection cycle, input data are applied to the bit buffer 12 and are stored therein by being shifted from the leftmost stage to the rightmost stage of each storage device 14. During the detection cycle, switch SW1 is closed so that the parallel inputs are applied to the parrallel feedback shift register 16. The shift register 16 is cycled in synchronism with the bit buffer and provides a division of the input data, modulo a coding polynomial. At the end of the detection cycle, all of the input data are stored in the bit buffer and the parallel feedback shift register should contain all zeros or some predetermined detection pattern if no error has occurred. Assuming that an error has occurred, a correction cycle is taken, during which SW1 is opened (allowing only zeroes to enter the register 16) and switch SW2 is closed. The storage devices 14 of the bit buffer are now shifted while at the same time the parallel feedback shift register is also shifted. As will be more fully explained later, the detector 18 detects a bit pattern in response to the state of the shift register 16 and this bit pattern identifies the particular track (1 . . . $s$) which is in error. Further, the bit pattern occurs at the time in the cycle at which the erroneous bit appears at the output of the bit buffer 12. Thus, one of the output lines 19 of the detector is energized and coincides with the erroneous bit output. Since the erroneous bit and the output of the detector are applied to an Exclusive OR 20, the erroneous bit is inverted, thus accomplishing error correction.

Figure 2:
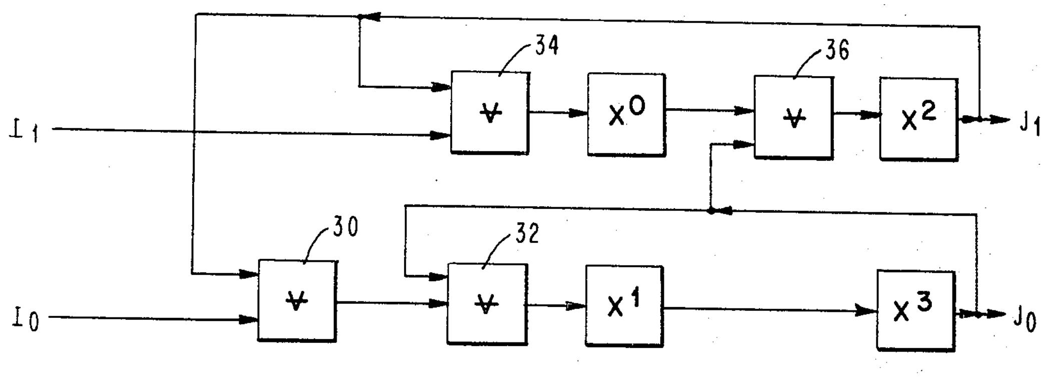
FIG. 2 is a block schematic diagram of a parallel shift register encoder and decoder which satisfies the coding polynomial, $1+X+X^4$, used as a divider.

FIG. 2 illustrates a divider network of the type described in the Kennedy and Sorg, Jr. patent application. The divider shown operates on a two-track signal for simplicity of explanation; however, any number of tracks may be utilized to practise the present invention. The two tracks are fed to the inputs $I_0$ and $I_1$ and the outputs of the register, $J_0$, $J_1$ are fed back to certain stages ($X^0$, $X^1$, $X^2$) via Exclusive OR circuits 30, 32, 34, 36 to effect a division modulo the coding polynomial $g(x)$ which, in this example, is $1+X+X^4$.

Figure 3:
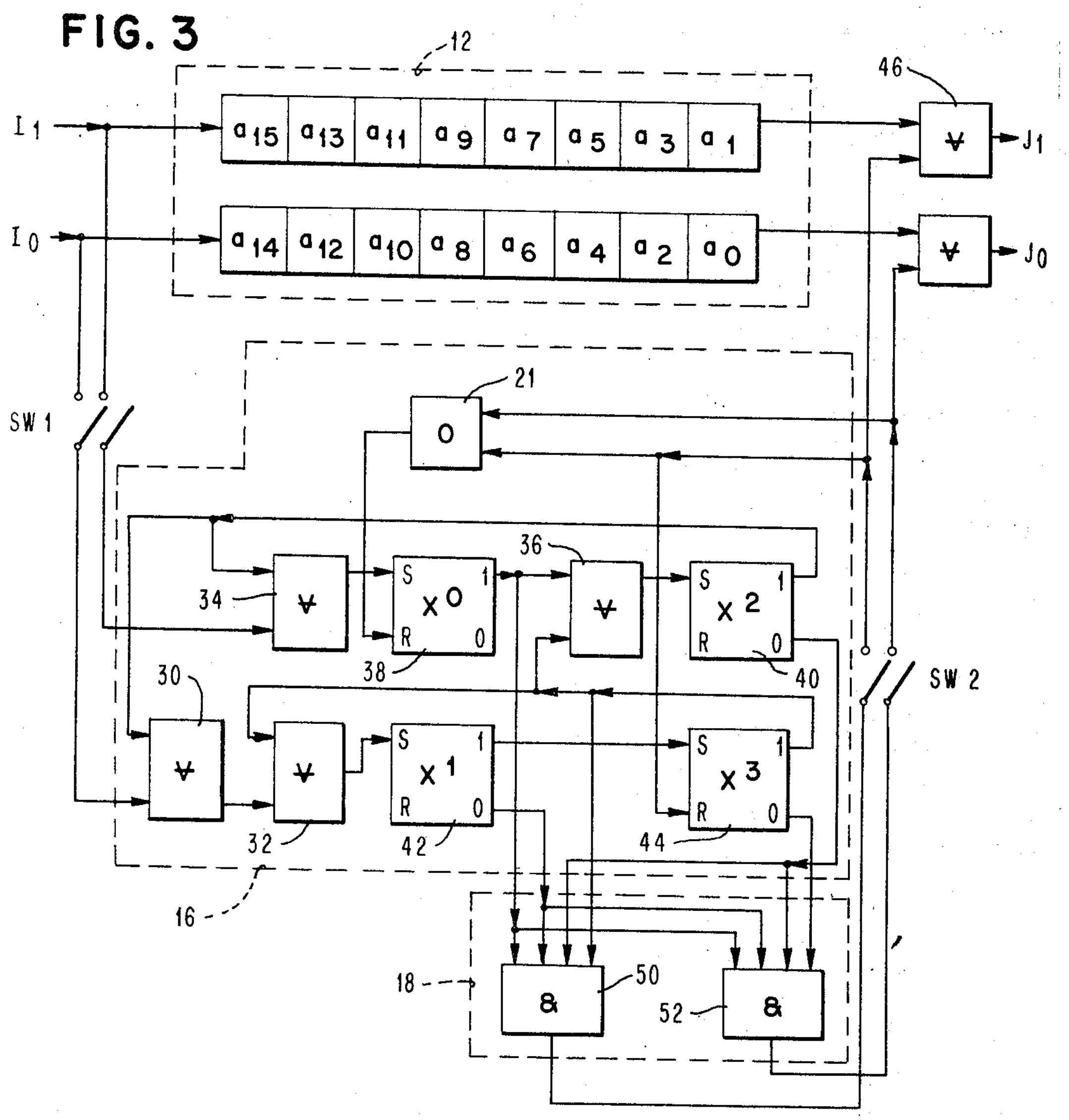
FIG. 3 is a block schematic diagram of a parallel error-detecting/correcting decoder for Hamming (15, 11) Code.

Referring now to FIG. 3, the divider shown in FIG. 2 is utilized to correct errors occurring in an encoded message. The message bits are encoded by an encoder of the type described in the above mentioned Kennedy and Sorg, Jr. patent application. The code word block received at the receiver shown in FIG. 3 is therefore comprised of a message, followed by check bits. The code word block is applied to the input $I_0$, $I_1$, and during the detection cycle, the switch SW1 is closed while SW2 is opened. The data are shifted into the divider 16 which multiplies the code word block by $X^r$ and divides the block by $g(x)$, the coding polynomial. At the end of the detection cycle, all of the code word bits have been shifted into the buffer storage 12 and have cycled through the divider 16 by a successive shifting operation. The remainder of the above described division is now stored in the register positions 38, 40, 42, 44. The Error Correction State Table, shown in Section 3.3.1 illustrates the contents of the divider at different points of the detection and correction cycle. In that example, the message code word chosen is as follows: 0 0 1 1 1 1 0 0 0 0 0 0 0 0 1 0. The higher order position is shown to the left. The right-hand zero is added to make the total bits divisible by 2.

This code word format in a parallel recording system is as follows:

0 1 1 0 0 0 0 0
0 1 1 0 0 0 0 1

Note that the only difference between the serial form and the parallel form is that the serial bits have been paired so that the first bit is introduced into the $I_0$ position and the second bit is introduced into the $I_1$ position of the decoder. Assume an error occurs as a pickup in the fourth bit of track $I_1$, which corresponds to bit $a_7$. Thus, at the end of the detection cycle, the contents of the divider are not equal to zero. Had the message been received error-free, the contents of the divider would be zero in accordance with the error-detecting properties of cyclic codes.

After the entire message has been shifted into the buffer 12 and has been cycled through the divider 16, switch SW1 is opened, switch SW2 is closed, and the correction cycle is begun. The bits stored in the buffer 12 are shifted through Exclusive ORs 46, 48 to the output lines $J_0$, $J_1$. The divider is also shifted in synchronism with the buffer while the detector 18, comprised of AND circuits 50 and 52, monitors the register for particular error patterns. AND circuit 50 is wired to recognize the pattern 1 0 0 1, which indicates an error in track $I_1$ and AND circuit 52 is wired to respond to the pattern 1 0 0 0, which indicates an error in track $I_0$. After three shift cycles, the erroneous bit position $a_7$ appears at the output stage of buffer 12. At the same time, the error pattern 1 0 0 1 is recognized by the AND circuit 50, which emits a pulse. The output of AND circuit 50 is combined with the output of buffer 12 in Exclusive OR 18. Thus, the bit $a_7$ appearing at the output of the buffer is inverted in the Exclusive OR to provide a corrected output on line $J_1$ of the decoder. This is shown in the table in section 3. 3. 1 wherein at the fourth shift of the correction cycle, the corrected bit emerges from the decoder. Had an error occurred in any other bit position, or in any other track, a corresponding error pattern would be generated at the correct time in the cycle.

This simple example illustrates the invention with respect to a two-track channel. The more detailed description below will teach those skilled in the art how to construct an error correction device for parallel codes comprised of any chosen message length and any number of plural tracks.

2.0 REVIEW OF PRIOR ART SINGLE CHANNEL CYCLIC CODES (SERIAL CIRCUITS)

A thorough treatment of error correction in serial circuits is found in J. E. Meggitt U.S. Patent 3,162,837, "Error Correcting Code Device with Modulo 2 Adder and Feedback Means," filed Oct. 26, 1960, and issued Dec. 22, 1964. The references cited therein should be consulted for further background information.

2.1 *Encoding a Single Channel Message*

A $(n, k)$ cyclic error correcting code is specified by a generator polynomial $g(x)$ of a degree $r=n-k$ such that $g(x)$ evenly divides the polynominal $x^n-1$ and the set of all code words is the set of all polynomials of degree $n-1$ or less that contain $g(x)$ as a factor. A code word is represented by $a_{n-1}, \ldots a_1, a_0$ and the high order coefficient $a_0$ is transmitted first. The code word is $n$ bits long; $k$ bits comprise the message and $r$ bits comprise the check bits, where $r=n-k$.

For any $g(x)=g_0+g_1x+g_2x^2+\ldots+g_rx^r$, there exists a companion matrix T defined by $$T=\begin{bmatrix} 0 & 1 & 0 & \cdots & 0 & 0 \\ 0 & 0 & 1 & \cdots & 0 & 0 \\ \cdot & & & & \vdots & \vdots \\ \cdot & & & & \vdots & \vdots \\ \cdot & & & & \cdot & \cdot \\ 0 & 0 & 0 & \cdots & 1 & 0 \\ 0 & 0 & 0 & \cdots & 0 & 1 \\ -g_0 & -g_1 & -g_2 & \cdots & -g_{r-2} & -g_{r-1} \end{bmatrix}$$

and the relation $T^n=I$ (identity matrix) for any $(n, k)$ cyclic code is equivalent to the relation $\alpha^n=I$ where $\alpha$ is a root of $g(x)$.

A circuit implementation referred to as a linear feedback shift register is utilized to perform the mathematical operations on the message to be encoded. In both encoding and decoding, the connections of the feedback shift register are determined by the generator polynomial $g(x)$ (companion matrix T) of the code. The encoding operation requires a circuit which will multiply a stream of message bits $(a_{k-1}, a_{k-2}, \ldots a_0)=a_{k-1}+a_{k-2}{}^x+\ldots+a_0x^{k-1}$ by $x^r$ and divide this result by $g(x)$. At the end of the message, the contents of the shift register comprise the remainder $R(x)$ of this division, which supplies the $r$ check bits to be attached onto the $k$ message bits to form a code word. After all the message bits have been transmitted, the feedback connections of the shift register are disabled and the contents of the shift register (the remainder) are serially read out following the message.

2.2 *Decoding and Correcting a Single Channel Message*

At the receiving end, all $n$ bits of a code word are fed into a decoding shift register identical to the encoding shift register. If there are no errors, the state of the shift register at the end of $n-1$ shifts is zero. The following relationship is thus satisfied:

$$a_0YT^{n-1}+a_1YT^{n-2}+\ldots+a_{n-2}YT+a_{n-1}Y=0$$

where $Y=(100\ldots0)$ is a serial input position vector. The above equation is derived from the fact that in a serial circuit, if the present state of a feedback shift register is represented by $r\times1$ row vector X, the next state after one feedback shift will be XT. T, therefore, is the transfer matrix of the serial circuit. Thus, the state after two shifts is $XT\cdot T$ or $XT^2$. The first bit of a message $(a_0)$ is thus shifted $n-1$ times; hence, the first term of the equation is $a_0YT^{n-1}$; the second bit $(a_1)$ is shifted $n-2$ times, etc.

If there are detectable errors in the received bits, the state of the shift register at the end of all the shifts will not be zero, but can be described by an error vector Z. This error vector Z serves as the basis for error correction. (See the Meggitt patent cited above, or "Error Correcting Codes and Their Implementation for Data Transmission Systems," J. E. Meggitt, Transactions of the IRE, vol. IT-7, pp. 234–244, October 1961).

3.0 MULTICHANNEL CIRCUITS EMPLOYING CYCLIC CODES

The aforementioned copending patent application of J. C. Kennedy and J. H. Sorg, Jr. applies cyclic error-detecting codes to multichannel circuits. The following sections develop the circuits using matrix algebra.

3.1 *Encoding a Multichannel Message*

In multichannel systems, the same choice of generator matrix is made as in the serial case, based upon the message length and the error correction requirement. Let $s$ be the number of channels; that is, information is transmitted in parallel, $s$ bits at a time. The transfer matrix of the desired parallel circuit is then given by $T^s$. This is because one shift in the parallel circuit is equivalent to $s$ shifts in the serial circuit. If X represents the present state of a parallel feedback shift register, $XT^s$ is the state of the register after one feedback shift. The notation $T^s=T$ parallel$=T_p$ will be used. The feedback connections of the desired parallel circuit divider (register 16 in FIG. 1) are completely defined by $T_p$. A "1" entry in the $ij^{th}$ element of the $T_p$-matrix indicates a connection from $i$-stage to $j$-stage; while a "0" entry indicates no connection.

The following procedure establishes the output connections. Let $J_0, J_1, \ldots, J_{s-1}$ be the outputs from the $s$ channels in parallel and $X_0, X_1, \ldots, X_{r-1}$ be the status of the $r$ stages in the feedback shift register. (See FIG. 1)

$$J_i=(X_0X_1\ldots X_{r-1})(T^i)\begin{bmatrix}0\\0\\\cdot\\\cdot\\\cdot\\0\\1\end{bmatrix},\ i=0, 1, \ldots, s-1$$

If we define $r\times s$ matrix R such that the $i^{th}$ column is given by $(T^{i-1})$ $(00\ldots01)$, then R is the transformation matrix between the initial state of the registers and the output signals. That is:

$$(J_0J_1\ldots J_{s-1})=(X_0X_1,\ldots X_{r-1})\ (R)_{r\times s}$$

The $i^{th}$ stage of the feedback shift register is connected to the output terminal $J_j$ if the R-matrix has an entry of "1" in its $ij^{th}$ element; otherwise, there is no connection. Note that the R-matrix has "1" entries only in the last $s$ rows.

In coding, when $n=k+r$ is not divisible by $s$, a sufficient number $(m)$ of zeros are added in the front of the $k$ message bits to make the total number of code words bits an integral multiple of $s(cs)$. In other words, $cs=n+m$. Of course, $m$ must be equal to or less than $s-1$; adding $s$ bits is never necessary. From the relationship, $$c\leq\frac{n-1}{s}+1$$

and $m$ can be found easily from $m=cs-n$.

3.1.1 Example: Encoding the Message $1+X+X^{10}$

Assume the $k$ message bits are $$(1\ 1\ 0\ 0\ 0\ 0\ 0\ 0\ 0\ 0\ 1)=1+X+X^{10}$$

Since $15(n)$ is not divisible by $2(s)$, a zero $(m=1)$ is added as the leading bit to make the total number of bits even. After all the bits $$(0\ 0\ 0\ 0\ 1\ 1\ 0\ 0\ 0\ 0\ 0\ 0\ 0\ 0\ 1\ 0)$$

are fed into the the circuit of FIG. 2, the contents of the register will be 0 0 1 1. The code word output of the encoding circuit, which is comprised (in part) of the shift register of FIG. 2, is therefore:

$$\begin{matrix}0\ 0\ 1\ 1\ 1\ 1\ 0\ 0\ 0\ 0\ 0\ 0\ 0\ 0\ 1\ 0\\ a_{15}\text{-----------------------}a_2a_1a_0\end{matrix}$$

Since the circuit of FIG. 3 is a two-channel parallel circuit, the message must be broken into pairs; $a_0$ is fed to input $I_0$, $a_1$ is fed to $I_1$, $a_2$ is fed to $I_0$, etc. The message is transmitted intact, followed by the contents of the shift register (the remainder $R_{(x)}$) as parallel bits.

3.2 *Decoding and Detection of Multichannel Cyclic Codes*

All the registers of FIG. 1 are initially cleared to zero. The received $(n+m)$ bits are fed into $s$ parallel buffer registers 14, each with $(n+m)/c$ stages, for temporary storage, with SW1 closed and SW2 open. The bits are also fed simultaneously into the feed back shift register 16, identical to the one used in the encoder. Since the information is received $s$ bits at a time, the input vectors are defined as:

$$A'_0=(a'_{s-1}, a'_{s-2}, \ldots, a'_1, a'_0)$$
$$A'_1=(a'_{2s-1}, a'_{2s-2}, \ldots a'_{s+1}, a'_s)$$
$$\vdots$$
$$A'_{c-1}=(a'_{n+m-1}, a'_{n+m-2}, \ldots, a'_{n+m-s})$$

where $a'_i$ is the received bit corresponding to $a_i$ in the code word.

After the first $s$ bits are fed into the shift register, the state in the register is $A'_0L$, where L is an input position matrix and has the form:

$$L=(L_s, O_{sx(rs)})$$

Here, I is an $s\times s$ identity matrix and O is an $s\times(r-s)$ zero matrix.

The state of the registers after receiving the second group of bits is given by $A'_0LT_p+A'_1L$. When all the bits are fed into the feedback shift register, the state of the register will be given by the following expression:

$$A'_0LT_p^{c-1}+A'_1LT_p^{c-2}+ \ldots +A_{c-2}LT_p+A'_{c-1}L=Z$$

If there has been no error, $a'_i=a_i$ and $A_i=A'_i$, the shift register will ultimately contain all zeros. That is:

$$Z=A_0LT_p^{c-1}+A_1LT_p^{c-2}+ \ldots +A_{c-2}LT_p+A_{c-1}L=O$$

In general, when there have been detectable errors, $Z\neq0$, and the final contents in the registers will not be zero. For correction, Z should be all different for distinct errors. Therefore, Z is called an error vector.

3.3 *Single Error Correction*

Assume that a single error in the group of bits $A_j$ has occurred. Then $$A'_j=A_j+W$$
$$A'_i=A_i i\neq j$$

where W is a $s\times1$ rows vector with a single 1 in one of the $s$ positions and 0 elsewhere. Substituting into the last equation in Section 3.2:

$$Z=WLT_p^{c-j-1}$$

During the correction cycles, SW1 in FIG. 1 is open and SW2 is closed. After $j$ more shifts, the erroneous group of bits $A'_j$ arrive at the right end of the bit buffer 12 and is ready to come out at the next shift. Note that $$T_p^{c-j-1}T_p^j=T_p^{c-1}$$

and the error vector Z after $j$ shifts becomes $Z_j$, i.e., $$Z_j=WLT_p^{c-1}$$

By examining the format of W, L, and $T_p^{c-1}$, one determines that a single error in $i^{th}$ $(1 \leq i \leq s)$ position of $A'_j$ corresponds to the $i^{th}$ row of $T_p^{c-1}$ to form $Z_j$. Since all the rows of $T_p^{c-1}$ are distinct, $s$ different AND gates according to the first $s$-rows of $T_p^{c-1}$ can be constructed as a detector 18 to recognize these $s$ different error patterns. Upon recognition, a "1" is emitted to the appropriate channel to correct the erroneous bit as it comes out of its buffer register 14 at the next shift and the feedback shift register is reset to zero by reset lines entering register 16 from detector 18 via SW2.

3.3.1 Extension of the Example in 3.1.1 above to error Correction

Refer now to FIG. 3 and recall that the received code word of the Hamming (15, 11) Code illustrated above was:

0 0 1 1 1 1 0 0 0 0 0 0 0 0 1 0
$a_{15}$------------------------$a_2a_1a_0$ and that: $m=1$, $c=8$, $s=2$. Grouping the bits in accordance with the notation used in 3.2 above:

$$A_0=(a_1a_0)=(1\ 0),\ A_1=A_2=A_c=A_4=A_7=(0\ 0)$$
$$A_5=A_6=(1\ 1)$$

Furthermore:

$$T_p=\begin{bmatrix}0&0&1&0\\0&0&0&1\\1&1&0&0\\0&1&1&0\end{bmatrix}\quad T_p^2=\begin{bmatrix}1&1&0&0\\0&1&1&0\\0&0&1&1\\1&1&0&1\end{bmatrix}\quad T_p^7=\begin{bmatrix}1&0&0&1\\1&0&0&0\\0&1&0&0\\0&0&1&0\end{bmatrix}$$

And the input position matrix (L) for $x=2$, $r=4$, is:

$$L=\begin{bmatrix}1&0&0&0\\0&1&0&0\end{bmatrix}$$

Substituting the above values into the last equation in section 3.2 (excluding those $A_i=(00)$ terms);

$$Z=A_0LT_p^7+A_5LT_p^2+A_6LT_p=[1\ 0]\begin{bmatrix}1&0&0&0\\0&1&0&0\end{bmatrix}\begin{bmatrix}1&0&0&1\\1&0&0&0\\0&1&0&0\\0&0&1&0\end{bmatrix}+[1\ 1]\begin{bmatrix}1&0&0&0\\0&1&0&0\end{bmatrix}\begin{bmatrix}1&1&0&0\\0&1&1&0\\0&0&1&1\\1&1&0&1\end{bmatrix}+$$
$$[1\ 1]\begin{bmatrix}1&0&0&0\\0&1&0&0\end{bmatrix}\begin{bmatrix}0&0&1&0\\0&0&0&1\\1&1&0&0\\0&1&1&0\end{bmatrix}=(0000)$$

as a validity check. Note that addition for purposes of example in this specification is modulo 2.

Assume that bit $a_7$ is received erroneously; that it is a "1" instead of a "0" bit $$A_3=(a_7a_6)\ A'_3=(1\ 0)=A_3+W$$

Thus: $W=(1\ 0)$ and the error vector Z is:

$$Z=W\ L\ T_p^4=(1\ 0)LT_p^4$$

The correction cycle is started after all code word bits have been stored in bit buffer 12.

After three shifts of the correction cycle, the erroneous bit $a'_7$ reaches the rightmost position of the upper buffer register of bit buffer 12, and the state of the shift register is given by:

$$ZT_p^3=WLT_p^7=[1\ 0]\begin{bmatrix}1&0&0&0\\0&1&0&0\end{bmatrix}\begin{bmatrix}1&0&0&1\\1&0&0&0\\0&1&0&0\\0&0&1&0\end{bmatrix}=$$

$$\underset{X^0}{[1}\quad\underset{X^1}{0}\quad\underset{X^2}{0}\quad\underset{X^3}{1]}$$

Similarly, if the bit $a_6$ is in error instead of $a_7$:

$$W=[0\ 1]$$

and $$ZT_p^3=WLT_p^7=\underset{X^0}{[1}\quad\underset{X^1}{0}\quad\underset{X^2}{0}\ \underset{X^3}{0]}$$

The above two equations specify the recognizable input patterns of the detector 18: 1 0 0 1 and 1 0 0 0. AND circuits 50, 52 in FIG. 3 are wired to recognize these patterns. The following table illustrates how error correction is accomplished when an error occurs in bit $a_7$ (indicated by *) of the message sequence chosen above.

ERROR CORRECTION STATE TABLE

| | Shift pulse | Decoder input | | Divider contents | | | | Decoder output | |
|---|---|---|---|---|---|---|---|---|---|
| | | $a_{2i}$ | $a_{2i+}$ | $X^0$ | $X^1$ | $X^3$ | $X^4$ | $a_{2i}$ | $a_{2i+}$ |
| | 0 | 0 | 0 | 0 | 0 | 0 | 0 | ----- | ----- |
| | 1 | 0 | 1 | 1 | 0 | 0 | 0 | ----- | ----- |
| | 2 | 0 | 0 | 0 | 0 | 1 | 0 | ----- | ----- |
| Detection | 3 | 0 | 0 | 1 | 1 | 0 | 0 | ----- | ----- |
| Cycle | 4 | 0 | 1 | 1 | 0 | 1 | 1 | ----- | ----- |
| SW1 closed | 5 | 0 | 0 | 1 | 0 | 0 | 0 | ----- | ----- |
| SW2 open | 6 | 1 | 1 | 1 | 1 | 1 | 0 | ----- | ----- |
| | 7 | 1 | 1 | 0 | 0 | 1 | 1 | ----- | ----- |
| | 8 | 0 | 0 | 1 | 0 | 1 | 0 | ----- | ----- |
| | 0 | ----- | ----- | 1 | 0 | 1 | 0 | ----- | ----- |
| Correction | 1 | ----- | ----- | 1 | 1 | 1 | 0 | 0 | 1 |
| cycle | 2 | ----- | ----- | 1 | 1 | 1 | 1 | 0 | 0 |
| | 3 | ----- | ----- | 1 | 0 | 0 | [1] 1 | 0 | 0 |
| SW1 open | 4 | ----- | ----- | 0 | 0 | 0 | 0 | 0 | [2] 0 |
| SW2 closed | 5 | ----- | ----- | 0 | 0 | 0 | 0 | 0 | 0 |
| | 6 | ----- | ----- | 0 | 0 | 0 | 0 | 1 | 0 |
| | 7 | ----- | ----- | 0 | 0 | 0 | 0 | 1 | 1 |
| | 8 | ----- | ----- | 0 | 0 | 0 | 0 | 0 | 1 |

[1] Emit 1.
[2] Corrected.

When the pattern 1 0 0 1 exists in the register 16, a pulse is emitted from AND 50. The output of AND 50 energizes one leg of Exclusive OR 46. At this time, the output of the last stage of bit buffer 12 contains bit $a_7$ which is now complemented by the action of Exclusive OR 46 to thereby provide a corrected output $J_1$. The output of AND 50 also resets the register by resetting stage $X^3$ directly and stage $X^0$ via OR 20.

3.4 *Multiple Error Correction*

The parallel decoder shown in FIG. 1 may be designed to correct multiple or burst errors, by choosing an appropriate error correction code capable of correcting a burst of errors of length $b$, along the serial representation of the code word $a_{n+m}, \ldots a_1, a_0$. The error pattern of the burst is defined as:

$$W_j, W_{j+1} \ldots W_{j+t-1}$$

(where $st \geqq b$; $t$ is the number of parallel shift periods spanned by the error burst.

The detector 18 is constructed to detect the configuration of bits in the shift register 16 given by:

$$Z_j = W_j L T_p^{c-1} + W_{j+1} L T_p^{c-2} \ldots + W_{j+t-1} T_p^{c-t}$$

where $Z_j$ is the error vector Z after $j$ shifts of the correction cycle, and L is the input position matrix described in section 3.2.

The following partial example illustrates this multiple error correction embodiment of the invention.

Assume: $s=4$, $b=7$.

The code word block is received in this configuration:

$$\begin{matrix} a_{n+m-1} \ldots a_{19} & a_{15} & a_{11}^* & a_7 & a_3 \\ a_{n+m-2} \ldots a_{18} & a_{14} & a_{10} & a_6 & a_2 \\ a_{n+m-3} \ldots a_{17} & a_{13} & a_9^* & a_5^* & a_1 \\ a_{n+m-4} \ldots a_{16} & a_{12}^* & a_8^* & a_4^* & a_0 \end{matrix}$$

$$\underbrace{\qquad\qquad\qquad}_{t=3}$$

Assume also that errors occur in bits $a_4$, $a_5$, $a_8$, $a_9$, $a_{11}$, $a_{12}$, indicated by (*) above.

Thus, $t=3$, because three-bit shift periods are spanned by the errors.

$$W_j = \bar{a}_4 \bar{a}_5 a_6 a_7 = (0\ 0\ 1\ 1)$$

$$W_{j+1} = \bar{a}_8 \bar{a}_9 a_{10} \bar{a}_{11} = (1\ 1\ 0\ 1)$$

$$W_{j+2} = \bar{a}_{12} a_{13} a_{14} a_{15} = (1\ 0\ 0\ 0)$$

Substituting into the above equation for $Z_j$:

$$Z_j = [0\ 0\ 1\ 1] \begin{bmatrix} 1\ 0\ 0\ 0\ 0 \ldots 0 \\ 0\ 1\ 0\ 0\ 0 \ldots 0 \\ 0\ 0\ 1\ 0\ 0 \ldots 0 \\ 0\ 0\ 0\ 1\ 0 \ldots 0 \end{bmatrix} [T_p^{c-1}] +$$

$$[1\ 1\ 0\ 1] \begin{bmatrix} 1\ 0\ 0\ 0\ 0 \ldots 0 \\ 0\ 1\ 0\ 0\ 0 \ldots 0 \\ 0\ 0\ 1\ 0\ 0 \ldots 0 \\ 0\ 0\ 0\ 1\ 0 \ldots 0 \end{bmatrix} [T_p^{c-2}] +$$

$$[1\ 0\ 0\ 0] \begin{bmatrix} 1\ 0\ 0\ 0\ 0 \ldots 0 \\ 0\ 1\ 0\ 0\ 0 \ldots 0 \\ 0\ 0\ 1\ 0\ 0 \ldots 0 \\ 0\ 0\ 0\ 1\ 0 \ldots 0 \end{bmatrix} [T_p^{c-3}] =$$

$$[0\ 0\ 1\ 1\ 0\ 0 \ldots 0][T_p^{c-1}] + [1\ 0\ 1\ 1\ 0\ 0 \ldots 0][T_p^{c-2}] + [1\ 0\ 0\ 0\ 0\ 0 \ldots 0][T_p^{c-3}] = [\ldots\ldots\ldots]$$

The final bit configuration depends upon the transfer matrix $T_p$ chosen, and will of course be different for different error-correcting codes. For simplicity, no such code is shown in this example, but such codes are well known in the art.

The final configuration $Z_j$, when recognized by detector 18, in FIG. 1, causes lines 1 and 2 of output lines 19 to be energized immediately, correcting bits $a_4$ and $a_5$ which at shift time $j$ in the correction cycle appear at the output of bit buffer 12. At shift time $j+1$, a signal is emitted on lines 1, 2, and 4 of output lines 19, thus correcting bits $a_8$, $a_9$, and $a_{11}$. At shift time $j+2$, a signal is emitted on line 1 of output lines 19, thus correcting bit $a_{12}$. Other burst multiple error configurations may be detected by providing detection circuits designed following the procedure outlined above.

Any code which will detect multiple errors will, of course, correct single errors. The single error correction circuitry needed in detector 18 for a given burst-error code is similar to that described above under Section 3.3, and need not be described here.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. In an error-correcting device, a decoder for receiving over a plurality of parallel channels, an $s$ channel code word of $n+m$ bits, where $n+m=cs$, and $c$ is an integer, and for generating a corrected output comprising:

a c-stage buffer in each channel for delaying said code word, a parallel linear feedback shift register for dividing said code word by a coding polynomial, said register including means for connecting said register to said plurality of channels, a detector connected to said register, responsive to the state of said shift register for detecting unique bit configurations therein, one such configuration existing for each erroneous channel, and inverting means at the output of each buffer and connectable to said detector for inverting bits emanating from said buffer in response to energization by said detecting means when one of said unique configurations is detected.

2. The combination according to claim 1 wherein said parallel shift register has feedback connections specified by a transfer matrix $$T_p = T^s$$

where T is the transfer matrix of a serial linear feedback shift register constructed in accordance with characteristics of the coding polynomial, and said detector detects $s$ different bit configurations in said shift register for locating an error in channels 1, 2, . . . $i$ . . . $s$, where the bit configuration for channel $i$ is specified by the $i^{th}$ row of the matrix:

$$T_p^{c-1}$$

3. In a multiple-channel transmission system of the type in which message bits are encoded in accordance with a cyclic code, a decoder adapted to receive the encoded bits forming a code word over a plurality of parallel channels comprising:

a buffer in each channel for delaying the code word;

a parallel linear feedback shift register having a number of stages equal to the number of elements of the check bits of said cyclic code and having a plurality of inputs adapted to receive the code word;

means connecting said register to said plurality of channels operable during a correction cycle to allow the contents of the shift register to be shifted without entering any new bits;

a bit configuration detector connected to said shift register for emitting a pulse when a predetermined configuration is recognized in said shift register during the correction cycle; and means operable during said correction cycle responsive to said detector for inverting the output of one of the buffers to thereby correct an erroneous bit.

4. An error-correcting data transmission device comprising:

a source of plural channel encoded data in the form of a code word;

a buffer for each channel, each buffer of sufficient length to store, in conjunction with the remaining buffers, the entire code word;

inverting means at the output of each buffer for inverting the output of the buffer in response to an input signal;

a parallel linear feedback shift register for dividing said parallel code word modulo a cyclic code polynomial;

means for applying said source of encoded signals to said buffer and said shift register during a detection cycle;

a bit configuration detection means for detecting a unique bit configuration in said shift register, one such configuration producing an output from the detector corresponding to each track;

and means for applying the outputs of said detector to corresponding inverting means associated with each track during a correction cycle;

whereby a bit emerging from the buffer in a particular track is inverted whenever the unique bit configuration identifying an error in that track is detected by said detection means.

5. In a multiple error-correcting device, a decoder for receiving over a plurality of parallel channels, an $s$ channel code word of length $n+m$ where $n+m=cs$, and $c$ is an integer, and for generating a corrected signal comprising:

a c-stage buffer in each channel for delaying said code word;

a parallel linear feedback shift register connectable to said channels for dividing said code word by a multiple error-correcting code polynomial;

a detector connected to said register, responsive to the state of said shift register for detecting unique bit configurations therein, one such configuration existing for each error pattern to be detected; and inverting means at the output of each buffer and connectable to said detector for inverting bits emanating therefrom in response to energization by said detecting means when one of said unique configuration is detected.

6. In a multiple error-correcting device, a decoder for receiving an $s$ channel code word of $n+m$ bits, where $n+m=cs$, and $c$ is an integer, and for generating a corrected signal comprising:

a c-stage buffer in each channel for delaying said code word, a parallel linear feedback shift register for dividing said code word by a multiple error-correcting code polynomial capable of correcting a burst of errors of length $b$, the error pattern of the burst being defined as $W_j$, $W_{j+1}$ . . . $W_{j+t-1}$ where $t$ is the number of parallel bit periods spanned by the burst, and $st \geqq b$;

said parallel shift register having feedback connections specified by the transfer matrix $$T_p = T^s$$

where T is the transfer matrix of a serial linear feedback shift register constructed in accordance with characteristics of the coding polynomial;

means for applying the code word to said buffer and said shift register during a detection cycle which causes the code word to be shifted through said shift register and shifted into said buffer;

a detector responsive to the state of said shift register for detecting unique bit configurations therein, one such configuration $Z_j$ existing for each error pattern to be detected, where:

$$Z_j = W_j L T_p^{c-1} + W_{j+1} L T_p^{c-2} \ . \ . \ . \ + W_{j+t-1} T_p^{c-t}$$

L being an input position matrix, said detector generating error-correcting outputs;

and means for applying the outputs of said detector to inverting means associated with each channel during a correction cycle during which the shift register and buffer are shifted;

whereby the inverting means at the output of each buffer inverts bits emanating from said buffer in response to energization by said detecting means when one of said unique configurations is detected.

7. The combination according to claim 6 wherein said detection means includes means responsive to detecting configuration $Z_j$ in said shift register for energizing the inverting means at the output of those buffers corresponding to the pattern defined by $W_j$ at the $j^{th}$ shift time of the correction cycle; $W_{j+1}$ at the $j+1^{th}$ shift time of the correction cycle; . . . and the pattern defined by $W_{j+t-1}$ at the $j+t-1^{th}$ shift time of the correction cycle.

No references cited.

MALCOLM A. MORRISON, *Primary Examiner.*

CHARLES E. ATKINSON, *Assistant Examiner.*